United States Patent
Sugimoto et al.

(10) Patent No.: US 11,384,686 B2
(45) Date of Patent: Jul. 12, 2022

(54) FASTENING STRUCTURE

(71) Applicant: NISSAN MOTOR CO., LTD., Yokohama (JP)

(72) Inventors: Tsuyoshi Sugimoto, Kanagawa (JP); Takahiro Hamada, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 50 days.

(21) Appl. No.: 16/966,107

(22) PCT Filed: Jan. 31, 2018

(86) PCT No.: PCT/JP2018/003091
§ 371 (c)(1),
(2) Date: Jul. 30, 2020

(87) PCT Pub. No.: WO2019/150464
PCT Pub. Date: Aug. 8, 2019

(65) Prior Publication Data
US 2021/0071569 A1   Mar. 11, 2021

(51) Int. Cl.
*F02B 75/04* (2006.01)
*F01L 1/34* (2006.01)

(52) U.S. Cl.
CPC .............. *F02B 75/047* (2013.01); *F01L 1/34* (2013.01)

(58) Field of Classification Search
CPC .................................. F02B 75/047; F01L 1/34
See application file for complete search history.

(56) References Cited

U.S. PATENT DOCUMENTS

| 4,930,910 A * | 6/1990 | Mori ...................... F16C 33/14 |
| | | 384/276 |
| 2004/0047757 A1 | 3/2004 | Takayama | |

FOREIGN PATENT DOCUMENTS

| JP | 2002047955 A * | 2/2002 | ............ F02B 75/045 |
| JP | 2003-328078 A | 11/2003 | |

OTHER PUBLICATIONS

Jack Kane, "Contemporary Crankshaft Design," Race Engine Technology, EPI Inc., Sep. 26, 2009, https://web.archive.org/web/20090926060941/http://www.epi-eng.com/piston_engine_technology/crankshaft_design_issues.htm (Year: 2009).*

* cited by examiner

*Primary Examiner* — Kevin A Lathers
(74) *Attorney, Agent, or Firm* — Foley & Lardner LLP

(57) ABSTRACT

A fastening structure (105) includes a pair of fastening members (105A) joined to each other, which is coupled with a bolt. The fastening member (105) is made of steel. A surface other than joint surfaces (Sa) has a Rockwell hardness of 50 HRC or more. The joint surfaces (Sa) have a Rockwell hardness of 30 HRC or more and less than 50 HRC. The joint surfaces (Sa) have an arithmetic mean roughness (Ra) of 0.2 μm or more and 0.5 μm or less. Production cost is suppressed, and at the same time, bending fatigue strength is secured and secondary damage due to abrasion powder generated by fretting is prevented.

14 Claims, 6 Drawing Sheets

FASTENING STRUCTURE

TECHNICAL FIELD

The present invention relates to a fastening structure, in which a pair of fastening members joined to each other is coupled with a bolt. More specifically, the present invention relates to a fastening structure to be used, for example, as a component of a link mechanism.

BACKGROUND ART

As an example of the fastening structure as described above, there may be mentioned an intermediate link to be used in a double-action link mechanism of a variable-compression-ratio engine. For the sake of convenience in being attached to a crankpin of a crankshaft, this intermediate link is split into the pair of fastening members at a part through which the crankpin is inserted. Then, the intermediate link is attached to the crankpin by coupling, with the bolts, the fastening members joined to each other with the crankpin sandwiched therebetween. In addition, other links of the double-action link mechanism are coupled respectively to the fastening members.

While the engine is running, the intermediate link (fastening structure) is subjected to repetitive bending input. Thus, in the production, a material having high bending-fatigue strength and a reinforcing process are needed. As disclosed in Patent Literature 1, a link securing high hardness and high toughness has been provided. According to the disclosure of Patent Literature 1, a high-hardness and high-toughness steel material having a hardness of HRC 50 or more is provided by properly adding Si, Al, Cr, Mo, V, W, Ni, and Co and by high-temperature tempering at 600° C. or more.

CITATION LIST

Patent Document

Patent Document 1: Japanese Patent Application Laid-open No. 2003-328078

SUMMARY OF INVENTION

Technical Problem

However, in the fastening structure as described above, due to clearances between the fastening members and the bolts, joint surfaces of the fastening members repeat minute reciprocation relative to each other. As a result, fretting, specifically, friction abrasion of the joint surfaces occurs. As a countermeasure, it is conceivable that the high-hardness and high-toughness steel material as disclose in Patent Literature 1 may be employed as the fastening structure. However, the steel material disclosed in Patent Literature 1 has a problem of high production cost due to the high tempering temperature and the variety of additive elements.

The present invention has been made in view of the circumstances as described above, and an object thereof is to provide a fastening structure, in which a pair of fastening members joined to each other is coupled with a bolt, the fastening structure being able to suppress production cost, and at the same time, secure bending-fatigue strength and prevent secondary damage due to fretting.

Solution to Problem

The fastening structure according to the present invention has a structure, in which a pair of fastening members joined to each other is coupled with a bolt. In addition, the fastening members of the fastening structure are made of steel; a surface other than joint surfaces of the fastening members has a Rockwell hardness of 50 HRC or more; the joint surfaces have a Rockwell hardness of 30 HRC or more and less than 50 HRC; and the joint surfaces have an arithmetic mean roughness Ra of 0.2 μm or more and 0.5 μm or less. In the production of the fastening members of the fastening structure, neither the variety of additive elements nor the high-temperature tempering is needed. The fastening structure can secure a desired hardness by using steel as its material and by carburizing and quenching.

Advantageous Effects of Invention

In the fastening structure according to the present invention, a hardness of the surface other than the joint surfaces of the fastening members is set to the Rockwell hardness of 50 HRC or more. With this, entire bending-fatigue strength is secured, and surface cracking damage due to bending fatigue is prevented. In addition, in the fastening structure, a hardness of the joint surfaces of the fastening members is set to the Rockwell hardness of 30 HRC or more and less than 50 HRC, and the arithmetic mean roughness Ra of the same is set to 0.2 μm or more and 0.5 μm or less. With this, particles of abrasion powder generated on the joint surfaces by the fretting are caught in valley parts of the roughness. As a result, the secondary damage due to the abrasion powder is prevented.

In such a way, the fastening structure can suppress the production cost of the structure, in which the pair of fastening members joined to each other is coupled with the bolt, and at the same time, can secure the bending fatigue strength and prevent the secondary damage due to the fretting.

DESCRIPTION OF THE EMBODIMENTS

First Embodiment

Figure 1:
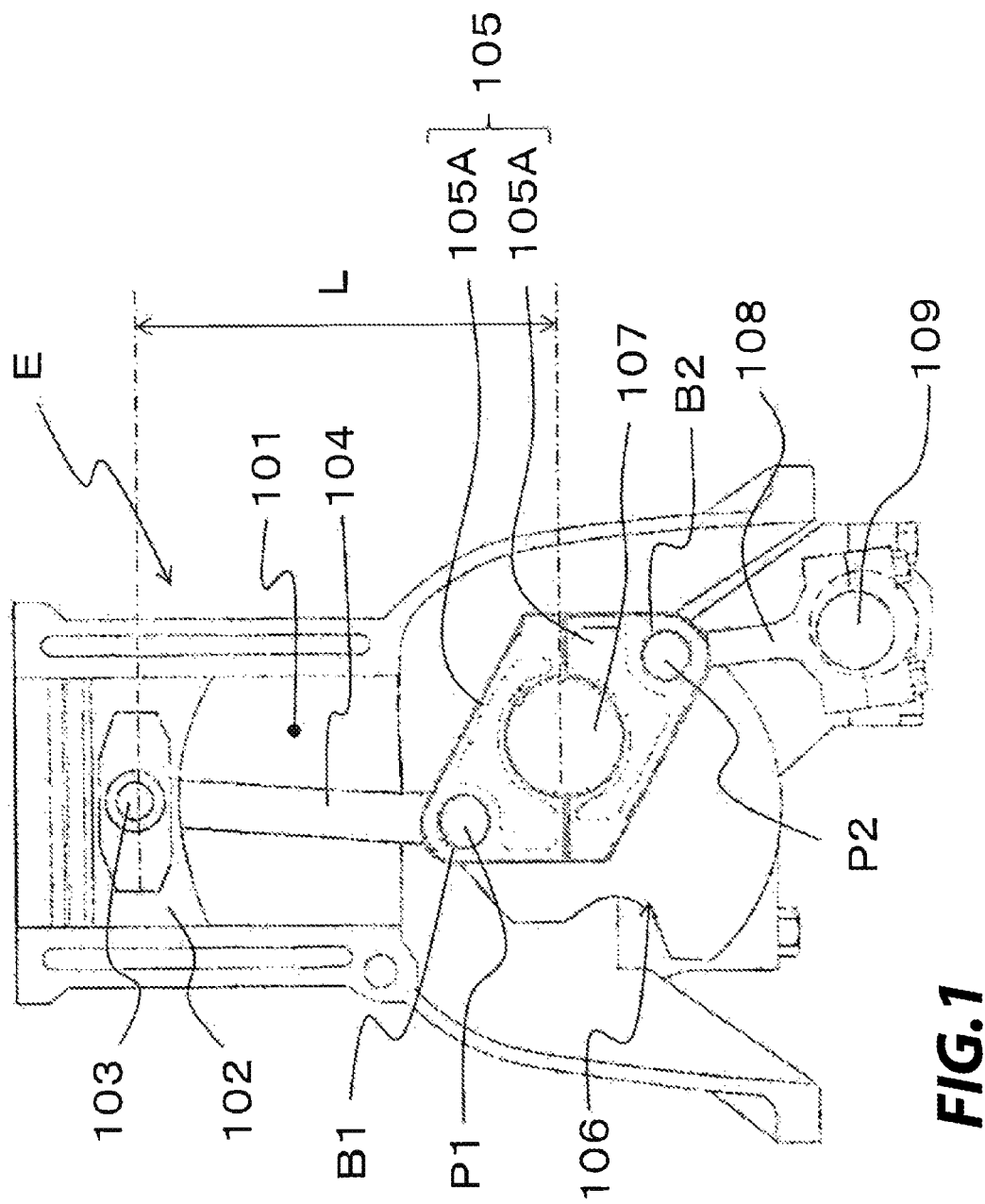
FIG. 1 is an explanatory cross-sectional view of a variable-compression-ratio engine to which a fastening structure according to a first embodiment of the present invention is applicable.

FIG. 1 is an explanatory cross-sectional view of a variable-compression-ratio engine to which a fastening structure according to the present invention is applicable. A variable-compression-ratio engine E illustrated in FIG. 1 includes a piston 102 which is reciprocated in a cylinder 101 and to which an upper end portion of an upper link 104 is coupled via a piston pin 103. The upper link 104 includes a lower end portion to which one end portion of an intermediate link 105 is coupled via a first link pin P1 and a first bushing B1.

The intermediate link 105 has a center through which a crankpin 107 of a crankshaft 106 is inserted, and includes another end portion to which an upper end portion of a lower link 108 is coupled via a second link pin P2 and a second bushing B2. The lower link 108 includes a lower end portion to which a control rod 109 is coupled, and the lower link 108 is connected to an actuator (not shown) that reciprocates this control rod 109 in parallel.

The variable-compression-ratio engine E configured as described above causes the lower link 108 to rotate about the crankpin 107 by moving the control rod 109. In this way, the variable-compression-ratio engine E varies a connecting-rod length L being a length from the crankpin 107 to the piston pin 103 to vary strokes of the piston 102, thereby varying a compression ratio.

Figure 2:
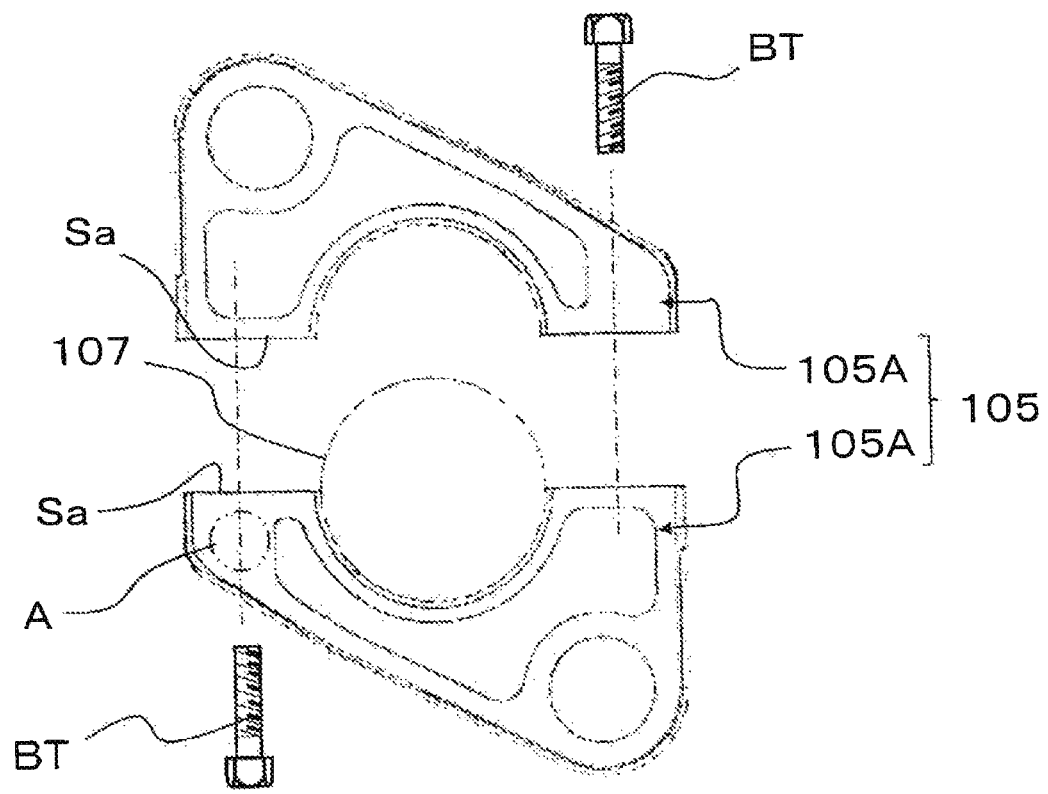
FIG. 2 is an explanatory side view in which an intermediate link being the fastening structure is disassembled.

Note that, as illustrated in FIG. 2, for the sake of convenience in being attached to the crankpin 107 of the crankshaft 106, the intermediate link 105 is split into a pair of link members 105A and 105A at the part through which the crankpin 107 is inserted. The two link members 105A and 105A are components having the same structure, specifically, having a rotationally symmetrical shape about the crankpin 107 in the side view of FIG. 2.

The link members 105A and 105A of the intermediate link 105 are joined to each other with the crankpin 107 sandwiched therebetween, and then, as illustrated in FIG. 2, are coupled to each other with bolts BT each screwed into a counterpart one of the link members 105A through one of the link members 105A. In this way, the intermediate link 105 is attached to the crankpin 107.

Then, the lower end portion of the upper link 104 is coupled to be rotatable to one of the link members 105A of the intermediate link 105 via the first link pin P1 and the first bushing B1. Further, the upper end portion of the lower link 108 is coupled to another one of the link members 105A via the second link pin P2 and the second bushing B2.

The intermediate link 105 moves to rotate the crankpin 107 about a central axis of the crankshaft 106 in conjunction with the reciprocation of the piston 102 while the variable-compression-ratio engine E is running, and hence is being subjected to repetitive bending input. In addition, for the sake of convenience in being attached to the crankpin 107, the intermediate link 105 inevitably has the split structure including the pair of link members 105A and 105A.

Thus, in the intermediate link 105, due to clearances between the link members 105A and the bolts BT, joint surfaces Sa of the link members 105A repeat minute reciprocation relative to each other. As a result, fretting, specifically, friction abrasion of the joint surfaces Sa occurs.

The fastening structure according to the present invention is suited to the intermediate link 105. In the following description, the intermediate link 105 including the pair of link members 105A and 105A is exemplified as a fastening structure including a pair of fastening members.

Specifically, as described above, the intermediate link 105 is formed by coupling, with the bolts BT, the pair of link members 105A and 105A joined to each other. The link members 105A are made of steel, in which a surface other than the joint surfaces Sa has a Rockwell hardness of 50 HRC or more, the joint surfaces Sa have a Rockwell hardness of 30 HRC to 50 HRC, and the joint surfaces Sa have an arithmetic mean roughness Ra of 0.2 μm to 0.5 μm.

In the production of the link members 105 of the intermediate link 105, neither a variety of additive elements nor high-temperature tempering is needed unlike the related art. The intermediate link 105 can secure a desired hardness by using steel as its material and by carburizing and quenching. In addition, in the link members 105, by polishing the joint surfaces Sa after the carburizing and the quenching, the Rockwell hardness of the joint surfaces Sa can be adjusted to 30 HRC or more and less than 50 HRC, and the arithmetic mean roughness Ra of the joint surfaces Sa can be adjusted to 0.2 μm or more and 0.5 μm or less.

By setting a lower limit of the hardness of the surface other than the joint surfaces Sa of the link members 105A, the intermediate link 105 can be prevented from buckling by surface pressure at the time of the fastening with the bolts. By setting an upper limit of this hardness, entire bending-fatigue strength of the intermediate link 105 can be secured, and surface cracking damage of the same due to bending fatigue can be prevented. Further, by setting the Rockwell hardness of the joint surfaces Sa of the link members 105A of the intermediate link 105 to be lower than that of the joint surfaces, hardness of abrasion powder generated by the fretting also decreases. As a result, the intermediate link 105 can be prevented from being secondarily damaged by the abrasion powder. Still further, by setting the arithmetic mean roughness Ra of the joint surfaces such that particles of the abrasion powder generated on the joint surfaces Sa by the fretting are caught in valley parts of the roughness, the secondary damage due to the abrasion powder is prevented. Note that, the particles of the abrasion powder refers to fine powder particles each having a diameter of 0.1 μm or less.

In such a way, the intermediate link (fastening structure) 105 can suppress production cost of the structure, in which the pair of link members (fastening members) 105A joined to each other is coupled with the bolts BT, and at the same time, can secure the bending fatigue strength and prevent the secondary damage due to the abrasion powder by the fretting.

Further, as a more preferred embodiment of the intermediate link 105, a surface layer of each of the joint surfaces Sa of the link members 105A may have a martensitic structure, and may contain 5% or more and 15% or less of retained austenite.

Specifically, the intermediate link 105 has, as the surface layer of the joint surfaces Sa, a hard and dense martensitic structure and a structure containing up to 15% of retained austenite. With this, the hardness of the joint surfaces Sa of the intermediate link 105 can be secured.

In addition, the intermediate link 105 has, as the surface layer of the joint surfaces Sa, also the hard and dense martensitic structure and a structure containing down to 5% of retained austenite. With this, a larger number of the particles of the abrasion powder generated by the fretting of the joint surfaces Sa are caught not only in the valley parts of the surface roughness but also by an austenite phase that is soft and highly deformable. As a result, the intermediate link 105 can be more reliably prevented from being secondarily damaged by the abrasion powder.

Figure 3:
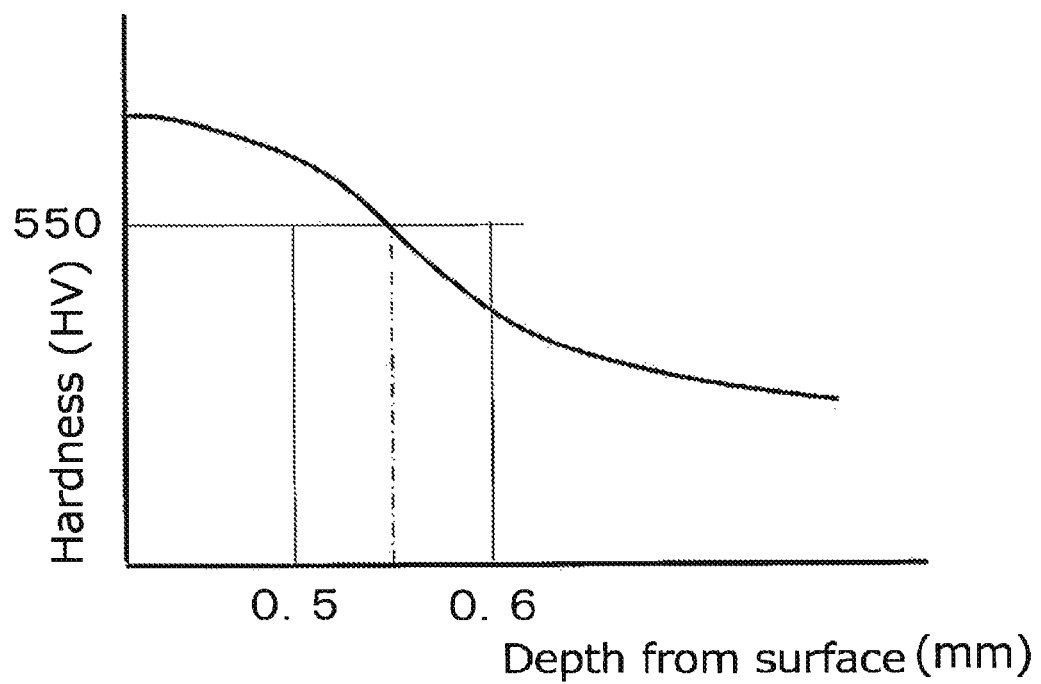
FIG. 3 is a graph showing a relationship between a Vickers hardness and a depth (distance) from a surface.

Still further, as another more-preferred embodiment of the intermediate link 105, as shown in FIG. 3, the hardness of the joint surfaces Sa may decrease inward from their surfaces, and may have a falling gradient in which a Vickers hardness at a position 0.5 mm or more and 0.6 mm or less away from the surfaces (depth positions) is 550 HV. In addition, the hardness becomes higher as a carbon concentration becomes higher, and hence the carbon concentration also decreases inward from the surfaces.

In other words, in the pair of link members 105A and 105A, in order to prevent the fretting abrasion of the joint surfaces Sa, it is effective to increase the surface pressure on the joint surfaces Sa so as to suppress a sliding amount during the running. Thus, by providing an effective hardened layer having a high hardness in the link members 105, depression resistance under high surface pressure can be secured, and both a decrease in surface-pressure due to depression at the time of the fastening with the bolts and the slide can be suppressed.

Yet further, as still another more-preferred embodiment of the intermediate link 105, an axial force of fastening the link members 105A to each other with the bolts BT may be set to 1,300 MPa or more and 1,800 MPa or less. In other words, the intermediate link 105 can provide bolt axial force to the internal effective-hardened layer to such an extent that does not cause depression.

Figure 4:
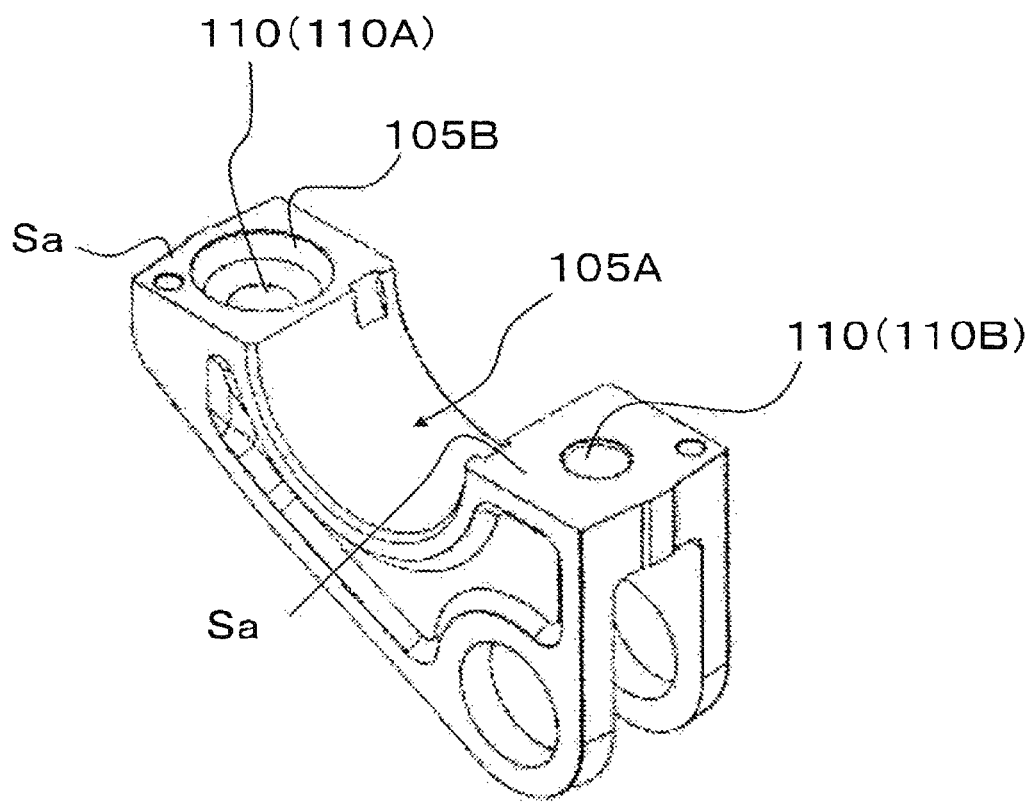
FIG. 4 is an explanatory perspective view of a link member being a fastening member.

Yet further, as yet another more-preferred embodiment of the intermediate link 105, as illustrated in FIG. 4, the link member 105A may include a counterbore recess portion 105B provided in an insertion portion 110 for the bolt BT in the joint surface Sa.

Figure 5:
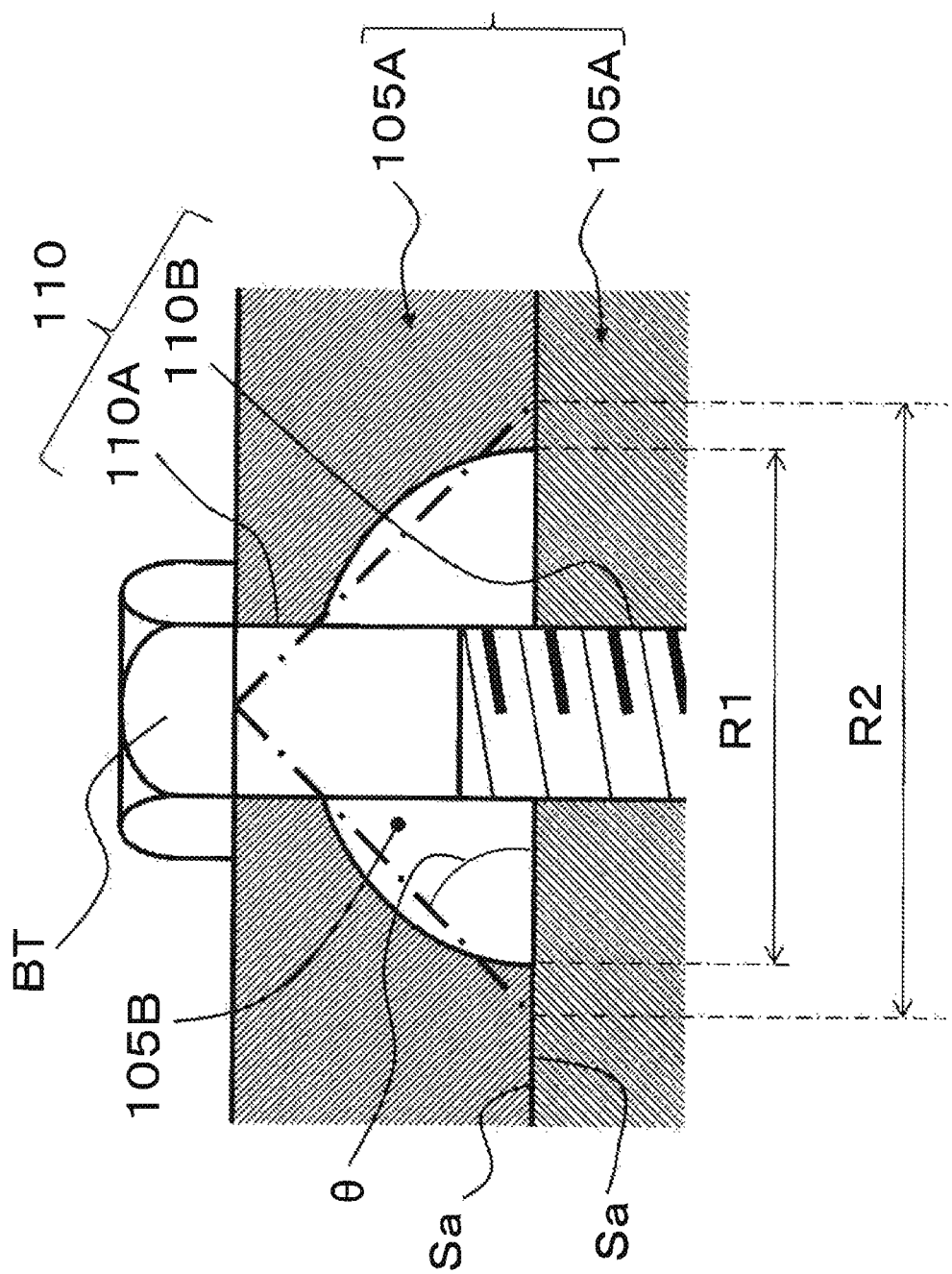
FIG. 5 is a cross-sectional view illustrating an insertion part for a bolt in the fastening structure.

Also as illustrated in FIG. 5, in each of the link members 105A, the recess portion 105B is provided on a head-portion side of the bolt BT. Specifically, the insertion portion 110 for the bolt BT includes a bolt insertion hole 110A of one of the link members 105A and a female threaded hole 110B of another one of the link members 105A. Thus, the recess portion 105B of each of the link members 105A is provided at a position on the head-portion side of the bolt BT, that is, on the bolt insertion hole 110A side.

Note that, although the recess portion 105B may be provided on a female threaded side of the bolt BT, by providing the recess portion 105B on the head-portion side of the bolt BT as in the example illustrated in FIG. 5, a range in which the bolt BT and the female threaded hole 110B are screwed together can be sufficiently secured.

In addition, the recess portion 105B is formed concentrically with the insertion portion 110 of the bolt BT, and its shape is not particularly limited. However, the recess portion 105B is preferably formed to have a curved inner surface in consideration of mechanical strength. In the example illustrated in FIG. 5, the recess portion 105B is formed into a hemispherical shape that is advantageous for securing the mechanical strength.

Note that, as well known, at the time of coupling the pair of members to each other with the bolts BT, the surface pressure to be generated on the joint surfaces Sa on each side concentrates on a concentric circle around the bolt BT, and is liable to be non-uniform in other parts. As illustrated in FIG. 5, on the joint surface Sa, the circle on which the surface pressure concentrates is a circle that defines a bottom plane of a conical shape which has a vertex corresponding to a center of the head portion of the bolt BT and in which an angle θ of 45 degrees is formed between the bottom plane and an oblique side. Thus, in the recess portion 105B, a diameter R1 of an opening portion of the joint surface Sa is set to be smaller than a diameter R2 of the bottom portion of the conical shape.

In other words, the intermediate link 105 has a structure in which a region on an inner side of the part on which the surface pressure concentrates is removed by the recess portion 105B from the joint surface Sa of the link member 105A. With this, joint areas of the link members 105A of the intermediate link 105 can be reduced. As a result, the surface pressure can be uniformly distributed on the joint surfaces Sa. In addition, when the axial force by the fastening with the bolt BT is applied, stress to be structurally generated by the provision of the recess portion 105B can be utilized to increase the surface pressure.

Yet further, as yet another more-preferred embodiment of the intermediate link 105, the joint surfaces Sa of the link members 105A may have a carbon concentration of 0.4 wt % or more and 0.6 wt % or less. In other words, by defining the range of the carbon concentration of the joint surfaces Sa of the intermediate link 105, an amount of the retained austenite in the surface layer of the joint surfaces Sa can be easily controlled.

In addition, as described with reference to FIG. 1, the intermediate link 105 is used in the variable-compression-ratio engine E that continuously varies the compression ratio by varying a top dead center of the piston 102 in accordance with a rotational position of the control shaft 109 arranged below the crankshaft 106. The intermediate link 105 has the structure in which the one and the other one of the link members 105A and 105A joined to each other with the crankpin 107 of the crankshaft 106 sandwiched therebetween are coupled to each other with the bolts BT.

In addition, the lower end portion of the first link 104 including the upper end portion coupled to the piston 102 is coupled to be rotatable to the one of the link members 105A. Meanwhile, the upper end portion of the second link 108 including the lower end portion coupled to an eccentric shaft portion of the control shaft 109 is coupled to be rotatable to the other one of the link members 105A.

As described above, while the variable-compression-ratio engine E is running, the intermediate link 105 is subjected to the repetitive bending input, and the joint surfaces Sa of the link members 105A repeat the minute reciprocation relative to each other.

As a countermeasure, in the intermediate link 105, the hardness of the surface other than the joint surfaces Sa of the link members 105A is defined, and the Rockwell hardness and the arithmetic mean roughness Ra of the joint surfaces Sa are defined. With this, the buckling is prevented, and the entire bending-fatigue strength can be secured. In addition, the particles of the abrasion powder generated on the joint surfaces Sa by the fretting are caught in the valley parts of the roughness. With this, the secondary damage due to the abrasion powder is prevented. In this way, the intermediate link 105 can contribute to an increase in durability of the variable-compression-ratio engine E.

Yet further, as yet another more-preferred embodiment of the intermediate link 105, production of the intermediate link 105 may include a step of performing carburizing the link members 105A, and the carburizing may be vacuum carburizing.

In this way, oxidation of the intermediate link 105 can be prevented, and the carbon concentration of the joint surfaces Sa of the link members 105 can be easily controlled. In addition, formation of a soft layer, which is difficult to be managed by normal hardness inspection, can be suppressed. As a result, management of an intergranular oxidized layer can be omitted. In addition, by performing vacuum-carburizing gas quenching as the vacuum carburizing, a cooling rate can be easily controlled, and the amount of the retained austenite can be suppressed.

Figure 6:
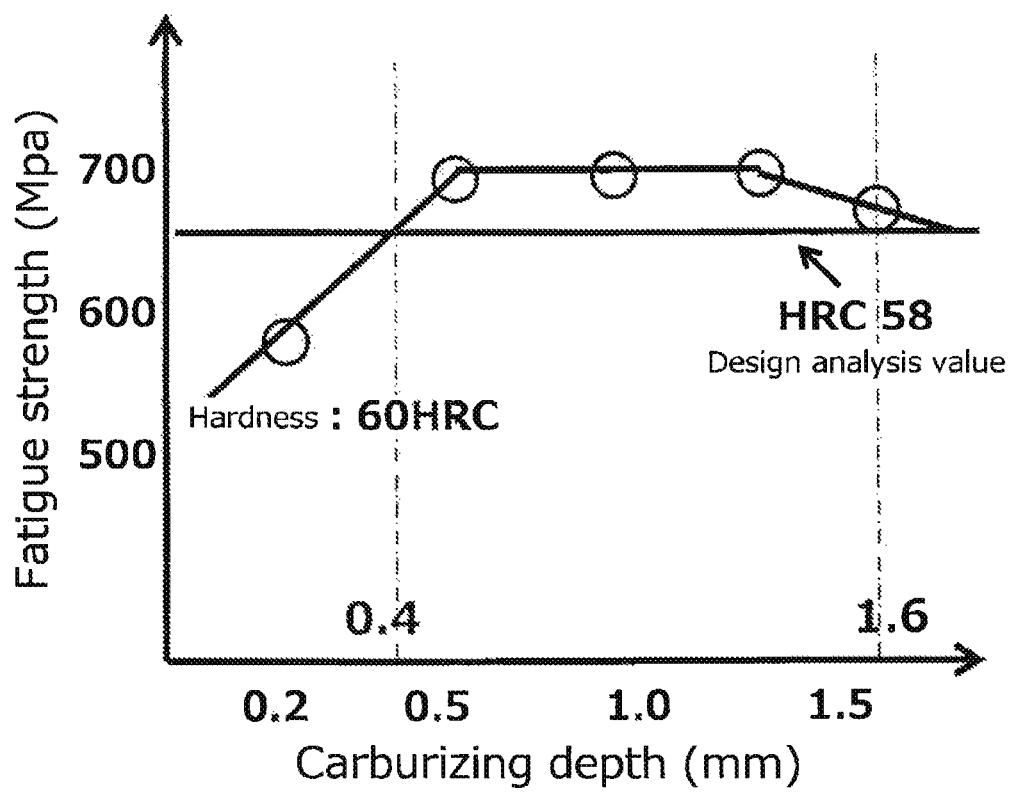
FIG. 6 is a graph showing a relationship between fatigue strength and a carburizing depth.

FIG. 6 is a graph showing a relationship between the fatigue strength and a carburizing depth. As is clear from this graph, when the link members 105 are carburized, by setting the carburizing depth within a range of 0.4 mm or more and 1.6 mm or less, fatigue strength of 650 MPa or more can be obtained.

EXAMPLES

In this context, by the processing procedure described below, link members (fastening members) of Examples 1 to 15 and Comparative Examples 1 to 5 were produced. SCr420H (JIS) was used as a material for the link members.

In Examples 1 to 14, the vacuum carburizing was performed. In this vacuum carburizing, link members made of steel were placed in a furnace, the inside of the furnace was evacuated, and the link members were heated at 1,050° C. Then, an acetylene gas was introduced into the furnace for 30 seconds. Next, a nitrogen gas was introduced for 4 minutes to carburize the link members. This sequence as one pulse was repeated several times. After that, before quenching, the link members were held at a temperature lower than the carburizing temperature, and then was quenched (cooled) with the nitrogen gas. During the quenching, the nitrogen gas was supplied at a pressure of 1.0 MPa.

In Example 15, gas carburizing was performed. In this gas carburizing, the link members made of steel were placed in the furnace, a butane gas was introduced into the furnace, a carbon potential (CP) in the furnace was set to 0.8, and the link members were carburized at 930° C. for 2.5 hours.

Further, in Examples 1 to 15 and Comparative Examples 1 to 5, the holding temperature before the quenching was set to different temperatures. This holding temperature is a condition for determining the hardness of the parts other than the joint surfaces of the link members. The other parts are soft when the temperature is low, and are hard when the temperature is high. Note that, the hardness of the parts other than the joint surfaces of the link members is evaluated preferably at a part where volume per unit is high, and hence the hardness was measured at a lateral surface portion around the bolt insertion hole (for example, portion A illustrated in FIG. 2).

Still further, in Examples 1 to 15 and Comparative Examples 1 to 5, the quenching was performed in postures different from each other. The quenching posture is a condition for determining the hardness of the joint surfaces of the link members, specifically, how the nitrogen gas is blown to the joint surfaces. The "vertical" refers to a posture in which the nitrogen gas is directly blown to the joint surfaces of the link members. In this case, the joint surfaces are rapidly cooled, and hence are hardened. Meanwhile, the "horizontal" refers to a posture in which the nitrogen gas is blown in a whirled manner to the joint surfaces of the link members. In this case, the temperature does not rapidly drop, and hence the joint surfaces are softened.

Yet further, in Examples 1 to 15 and Comparative Examples 1 to 5, the joint surfaces of the link members were polished to until values of the arithmetic mean roughness Ra shown in Table 1 were obtained.

Yet further, in Examples 1 to 15 and Comparative Examples 1 to 5, the link members were carburized with a different number of the pulses. The number of the pulses is a condition for causing the link members to have the Vickers hardness of 550 HV at the position 0.5 mm to 0.6 mm away from the surface of the joint surface. As the number of the pulses becomes larger, carbon reaches deeper and the joint surfaces become harder.

Yet further, in Examples 1 to 15 and Comparative Examples 1 to 5, a quenching gas temperature was set to different temperatures. This quenching gas temperature is a condition for determining the amount of the retained austenite in the joint surfaces of the link members. As the gas temperature becomes higher, the amount of the retained austenite becomes larger.

In Examples 1 to 15 and Comparative Examples 1 to 5, the Rockwell hardness of the parts other than the joint surfaces of the link members, the amount of the retained austenite in the joint surfaces of the link members, whether or not the intergranular oxidized layer was formed and its thickness, the Rockwell hardness, a carbon content (carbon concentration), the arithmetic mean roughness Ra, and the depth at which the Vickers hardness of 550 HV was obtained (depth from the joint surfaces) of the joint surfaces of the link members were measured. Note that, in all Examples except Example 12 and all Comparative Examples, the counterbore recess portion in the joint surfaces was formed into the hemispherical bowl shape. In Example 12, the joint surfaces are formed into a flat surface without the recess portion.

In the measurement of the Rockwell hardness, HRC hardness (according to JIS Z2245) of the parts other than the joint surfaces of the link members and that of the joint surfaces of the link members were calculated as a 5-point average with a Rockwell hardness meter.

In the measurement of the arithmetic mean roughness Ra, an arithmetic mean roughness Ra (according to JIS B0601-1994) of the joint surfaces of the link members were calculated with a stylus-type roughness meter.

In the measurement as to whether or not the intergranular oxidized layer was formed, whether or not the intergranular oxidized layer was formed was checked by analyzing constituent elements in a cross-sectional depth direction of the joint surfaces of the link members with an electron probe micro analyzer. In addition, in the measurement of the thickness of the intergranular oxidized layer, the thickness of the intergranular oxidized layer was measured by observing its cross-section under a scanning electron microscope.

In the measurement of the amount of the retained austenite, the amount of the retained austenite in the joint surfaces of the link members was analyzed with an X-ray diffractometer.

In the measurement of the carbon content (carbon concentration), the carbon concentration of the joint surfaces of the link members was measured with the electron probe micro analyzer (EPMA).

In the measurement of the Vickers hardness, the position at which the Vickers hardness HV of 550 HV was obtained was specified by measuring the Vickers hardness in the depth direction from the surfaces in the cross-section of the joint surfaces of the link members with a Vickers hardness meter (measured according to JIS Z 2244).

Yet further, in Examples 1 to 15 and Comparative Examples 1 to 5, the pair of link members were coupled to each other with bolts to form the intermediate link, and then the axial force of fastening with the bolts was measured. In addition, a fatigue test was conducted at a stress ratio of zero. Specifically, the pair of link members coupled to each other with the bolts were tested at the stress ratio of zero under a load of 48 kN by using a computer-controlled Instron 8501 hydraulic testing machine at room temperature in an atmospheric environment. A repetition frequency was set to 10 Hz, and the number of cycles was set to 10 million times, and a state of the link component after the test was checked.

Table 1 shows the processing conditions and the measurement results in Examples 1 to 15 and Comparative Examples 1 to 5.

TABLE 1

| | Hardness (HRC) of Part Other than Joint Surface | Amount (%) of Retained Austenite in Joint Surface | Carburizing Method | Intergranular Oxidized Layer (μm) | Surface Hardness (HRC) of Joint Surface | Carbon Content (wt %) of Joint Surface | Roughness (Ra) of Joint Surface | Depth (mm) Corresponding to 550 HV of Joint Surface | Fastening Axial Force (MPa) | Shape of Joint Portion | Observation of Details | Observation of Details | Holding Temperature (° C.) before Quenching | Quenching Posture | Carburizing Condition and Number of Pulses | Quenching Gas Temperature (° C.) |
|---|---|---|---|---|---|---|---|---|---|---|---|---|---|---|---|---|
| Example 1 | 54 | 15 | Vacuum Carburizing | 0 | 32 | 0.44 | 0.4 | 0.53 | 1,400 | Bowl Shape | No Damage | — | 880 | Horizontal | 8 | 130 |
| Example 2 | 58 | 11 | Vacuum Carburizing | 0 | 34 | 0.48 | 0.42 | 0.55 | 1,520 | Bowl Shape | No Damage | — | 890 | Vertical | 8 | 120 |
| Example 3 | 58 | 14 | Vacuum Carburizing | 0 | 38 | 0.52 | 0.21 | 0.54 | 1,600 | Bowl Shape | No Damage | — | 930 | Vertical | 8 | 125 |
| Example 4 | 61 | 12 | Vacuum Carburizing | 0 | 48 | 0.56 | 0.28 | 0.59 | 1,600 | Bowl Shape | No Damage | — | 980 | Vertical | 8 | 120 |
| Example 5 | 57 | 8 | Vacuum Carburizing | 0 | 44 | 0.45 | 0.32 | 0.53 | 1,730 | Bowl Shape | No Damage | — | 970 | Vertical | 8 | 100 |
| Example 6 | 63 | 4 | Vacuum Carburizing | 0 | 44 | 0.58 | 0.34 | 0.59 | 1,400 | Bowl Shape | No Damage | Cracks | 950 | Vertical | 8 | 80 |
| Example 7 | 54 | 18 | Vacuum Carburizing | 0 | 43 | 0.59 | 0.43 | 0.54 | 1,560 | Bowl Shape | No Damage | Cracks | 940 | Horizontal | 8 | 150 |
| Example 8 | 59 | 12 | Vacuum Carburizing | 0 | 48 | 0.5 | 0.4 | 0.43 | 1,700 | Bowl Shape | No Damage | Cracks | 980 | Vertical | 6 | 120 |
| Example 9 | 59 | 12 | Vacuum Carburizing | 0 | 48 | 0.5 | 0.33 | 0.67 | 1,700 | Bowl Shape | No Damage | Cracks | 980 | Vertical | 10 | 120 |
| Example 10 | 53 | 9 | Vacuum Carburizing | 0 | 42 | 0.45 | 0.42 | 0.59 | 1,100 | Bowl Shape | No Damage | Cracks | 940 | Horizontal | 8 | 120 |
| Example 11 | 56 | 8 | Vacuum Carburizing | 0 | 43 | 0.55 | 0.22 | 0.6 | 1,920 | Bowl Shape | No Damage | Cracks | 940 | Horizontal | 8 | 120 |
| Example 12 | 59 | 14 | Vacuum Carburizing | 0 | 46 | 0.54 | 0.3 | 0.52 | 1,700 | Flat Surface | No Damage | Cracks | 970 | Vertical | 8 | 125 |
| Example 13 | 59 | 13 | Vacuum Carburizing | 0 | 49 | 0.38 | 0.25 | 0.58 | 1,760 | Bowl Shape | No Damage | Cracks | 985 | Vertical | 8 | 122 |
| Example 14 | 55 | 10 | Vacuum Carburizing | 0 | 45 | 0.72 | 0.34 | 0.54 | 1,750 | Bowl Shape | No Damage | Cracks | | | | |
| Example 15 | 55 | 10 | Gas Carburizing | 21 | 41 | 0.43 | 0.47 | 0.54 | 1,720 | Bowl Shape | No Damage | Cracks | | | | |
| Comparative Example 1 | 49 | 13 | Vacuum Carburizing | 0 | 40 | 0.42 | 0.46 | 0.58 | 1,630 | Bowl Shape | Damaged | Damaged by Fretting | | | | |
| Comparative Example 2 | 52 | 10 | Vacuum Carburizing | 0 | 28 | 0.43 | 0.3 | 0.52 | 1,350 | Bowl Shape | Damaged | Damaged by Fretting | | | | |
| Comparative Example 3 | 59 | 12 | Vacuum Carburizing | 0 | 54 | 0.49 | 0.44 | 0.57 | 1,580 | Bowl Shape | Damaged | Damaged by Fretting | | | | |
| Comparative Example 4 | 62 | 13 | Vacuum Carburizing | 0 | 42 | 0.52 | 0.7 | 0.58 | 1,790 | Bowl Shape | Damaged | Damaged by Fretting | | | | |
| Comparative Example 5 | 62 | 13 | Vacuum Carburizing | 0 | 42 | 0.52 | 0.01 | 0.58 | 1,790 | Bowl Shape | Damaged | Damaged by Fretting | | | | |

TABLE 1-continued

| | | | | |
|---|---|---|---|---|
| Example 14 | 940 | Vertical | 8 | 110 |
| Example 15 | 930 | Vertical | Gas Carburizing | 110 |
| Comparative Example 1 | 930 | Horizontal | 8 | 122 |
| Comparative Example 2 | 870 | Horizontal | 8 | 110 |
| Comparative Example 3 | 1,000 | Vertical | 8 | 120 |
| Comparative Example 4 | 950 | | 8 | 122 |
| Comparative Example 5 | 930 | | 8 | 122 |

As is clear from Table 1, in all of Comparative Examples 1 to 5, the crankpin-attachment portions of the link members (particularly, shortest-distance portions between the attachment portions and outside) were damaged. In Comparative Example 1, the Rockwell hardness of the parts other than the joint surfaces is 48 HRC. In Comparative Example 2, the Rockwell hardness of the joint surfaces is 28 HRC. In Comparative Example 3, the Rockwell hardness of the joint surfaces is 54 HCR. In Comparative Example 4, the arithmetic mean roughness Ra of the joint surfaces is 0.7 µm. In Comparative Example 5, the arithmetic mean roughness Ra of the joint surfaces is 0.01 µm.

In contrast, in none of Examples 1 to 15, damage to the joint surfaces was found. In Examples 6 to 15, the joint surfaces were shifted from each other by the fretting, and minute cracks were found. In Example 12, since the counterbore recess portion was not formed, minute cracks were formed in the joint surfaces. Note that, the cracks formed in Examples 6 to 15 are as significantly fine as not to be structurally influential and as not to impair product availability.

In more detail of Examples 1 to 15, in Example 6, the amount of the retained austenite in the joint surfaces is 4%. In Example 7, the amount of the retained austenite in each of the joint surfaces is 18%. In Example 8, the depth (distance from the joint surfaces) at which the Vickers hardness of 550 HV is obtained is 0.43 mm. In Example 9, the depth at which the Vickers hardness of 550 HV is obtained is 0.67 mm.

In addition, in Example 10, the axial force of fastening the link members to each other is 1,100 MPa. In Example 11, the axial force of fastening the link members to each other is 1,920 MPa. In Example 12, as described above, the joint surfaces are formed into the flat surface without the recess portion. In Example 13, the carbon content (carbon concentration) of the joint surfaces is 0.38 Cwt %. In Example 14, the carbon content of the joint surfaces is 0.72 Cwt %. In Example 15, the gas carburizing was performed, and a resultant intergranular oxidized layer having a thickness of 21 µm was found. This intergranular oxidized layer may be a starting point of the cracks, and hence is preferably not formed.

The above-described test results have demonstrated the following conditions (1) to (9) that are necessary for or suited to the fastening structure (intermediate link) according to the present invention.
(1) Setting the hardness of the surface other than the joint surfaces to the Rockwell hardness of 50 HRC or more.
(2) Setting the hardness of the joint surfaces to the Rockwell hardness of 30 HRC or more and less than 50 HRC.
(3) Setting the arithmetic mean roughness Ra of the joint surfaces to 0.2 µm or more and 0.5 µm or less.
(4) The surface layer of the joint surfaces has the martensitic structure containing 5% or more and 15% or less of retained austenite.
(5) Setting the Vickers hardness at the position 0.5 mm or more and 0.6 mm or less away from the surface of the joint surfaces to 550 HV.
(6) Setting the axial force of fastening the fastening members to each other with the bolts to 1,300 MPa or more and 1,800 MPa or less.
(7) Forming the counterbore recess portion in the insertion portion for the bolts in the joint surfaces.
(8) Setting the carbon concentration of the joint surfaces to 0.4 wt % or more and 0.6 wt % or less.
(9) Performing the vacuum carburizing as the carburizing.

It has been found that, when at least the conditions (1) to (3) of the above-listed conditions (1) to (9) are satisfied, the fastening structure according to the present invention provides, to some extent, an advantage of securing the capability to secure the bending fatigue strength and to provide the fretting resistance. In addition, as is clear from Comparative Examples 1 to 5, damage occurred if even one of the conditions (1) to (3) was not satisfied.

In addition, with regard to Examples 1 to 5 in each of which all the above-listed conditions (1) to (9) are satisfied, it has been found that the fretting of the joint surfaces is suppressed, and that the bending fatigue strength is secured and at the same time the secondary damage due to the abrasion powder by the fretting is prevented. In other words, an advantage of the above-listed conditions (1) to (9) for the fastening structure according to the present invention to secure the bending fatigue strength and to provide the fretting resistance has been confirmed.

Details of the configuration of the fastening structure according to the present invention are not limited to those in the embodiment and Examples described above, and appropriate changes may be made thereto within the gist of the present invention. In addition, the intermediate link to be used in the variable-compression-ratio engine, which is exemplified as the fastening structure in each of the embodiments, is applicable to various fastening structures, each of which has the structure including the pair of fastening members that are coupled to each other with the bolts, and in each of which the respective joint surfaces of the fastening members reciprocate relative to each other.

REFERENCE SIGNS LIST

E Variable-compression-ratio engine
102 Piston
104 First link
105 Intermediate link (fastening structure)
105A Link member (fastening member)
105B Recess portion 106 Crankshaft
107 Control shaft
107 Crankpin
108 Second link
BT Bolt
Sa Joint surface

The invention claimed is:

1. A fastening structure,
wherein
the fastening structure is used in a variable-compression-ratio engine that continuously varies a compression ratio by varying a top dead center of a piston in accordance with a rotational position of a control shaft arranged below a crankshaft,
wherein
the fastening structure has a structure in which one and another fastening members joined to each other with a crankpin of the crankshaft sandwiched between are coupled with a bolt,
a lower end portion of a first link including an upper end portion coupled to the piston is coupled to be rotatable to the one of the fastening members, and
an upper end portion of a second link including a lower end portion coupled to an eccentric shaft portion of the control shaft is coupled to be rotatable to the another of the fastening members, and
wherein
the fastening members are made of steel,
a surface other than joint surfaces has a Rockwell hardness of 50 HRC or more,
the joint surfaces have a Rockwell hardness of 30 HRC to less than 50 HRC, and
the joint surfaces have an arithmetic mean roughness Ra of 0.2 μm to 0.5 μm.

2. The fastening structure according to claim 1, wherein a surface layer of the joint surfaces of the fastening members has a martensitic structure, and contains 5% to 15% of retained austenite.

3. A method of producing a fastening structure, in which the fastening structure is the fastening structure according to claim 2, comprising a step of performing carburizing the fastening members,
wherein the carburizing is vacuum carburizing.

4. The fastening structure according to claim 1, wherein a hardness of the joint surfaces of the fastening members decreases inward from a surface, and has a falling gradient in which a Vickers hardness at a position of 0.5 mm to 0.6 mm away from the surface is 550 HV.

5. A method of producing a fastening structure, in which the fastening structure is the fastening structure according to claim 4, comprising a step of performing carburizing the fastening members,
wherein the carburizing is vacuum carburizing.

6. The fastening structure according to claim 2, wherein a hardness of the joint surfaces of the fastening members decreases inward from a surface, and has a falling gradient in which a Vickers hardness at a position of 0.5 mm to 0.6 mm away from the surface is 550 HV.

7. A method of producing a fastening structure, in which the fastening structure is the fastening structure according to claim 6, comprising a step of performing carburizing the fastening members,
wherein the carburizing is vacuum carburizing.

8. The fastening structure according to claim 1, wherein an axial force of fastening the fastening members to each other with the bolt is 1,300 MPa to 1,800 MPa.

9. A method of producing a fastening structure, in which the fastening structure is the fastening structure according to claim 8, comprising a step of performing carburizing the fastening members,
wherein the carburizing is vacuum carburizing.

10. The fastening structure according to claim 8, wherein the fastening members include recess portions provided in an insertion portion for the bolt in the joint surfaces.

11. A method of producing a fastening structure, in which the fastening structure is the fastening structure according to claim 10, comprising a step of performing carburizing the fastening members,
wherein the carburizing is vacuum carburizing.

12. The fastening structure according to claim 1, wherein the joint surfaces of the fastening members have a carbon concentration of 0.4 wt % to 0.6 wt %.

13. A method of producing a fastening structure, in which the fastening structure is the fastening structure according to claim 12, comprising a step of performing carburizing the fastening members,
wherein the carburizing is vacuum carburizing.

14. A method of producing a fastening structure, in which the fastening structure is the fastening structure according to claim 1, comprising a step of performing carburizing the fastening members,
wherein the carburizing is vacuum carburizing.

* * * * *